April 14, 1970  D. E. BELL ET AL  3,506,497
WET CELL BATTERY WITH IMPROVED VENT
Filed Dec. 5, 1967

United States Patent Office 3,506,497
Patented Apr. 14, 1970

3,506,497
WET CELL BATTERY WITH IMPROVED VENT
Donald E. Bell, Wilkinsburg, Pa., and John F. Dauster, deceased, late of Penn Hills Township, Pa., by Grace Elle Dauster, executrix, Penn Hills Township, Pa., assignors to Mine Safety Appliances Company, Pittsburgh, Pa., a corporation of Pennsylvania
Filed Dec. 5, 1967, Ser. No. 689,749
Int. Cl. H01m 1/06
U.S. Cl. 136—177                5 Claims

ABSTRACT OF THE DISCLOSURE

A wet cell battery case is provided internally with tubular means extending downwardly from the top of the case around a vent and provided with an internal annular ledge. A porous disc spaced below the ledge closes an opening in the lower end of the tubular means. Baffle means are disposed in the tubular means below the ledge to form tortuous passages extending from the disc and a port in the side of the tubular means to a central opening encircled by the ledge.

---

It is among the objects of the invention to provide a wet cell battery, from which gases can escape and in which vapor can condense and drain back into the cell, without danger of liquid splashing out of the battery.

Figure 1:
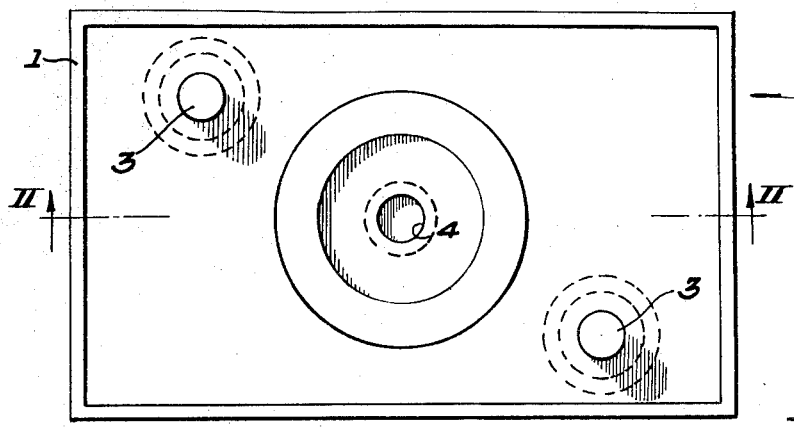
Figure 2:
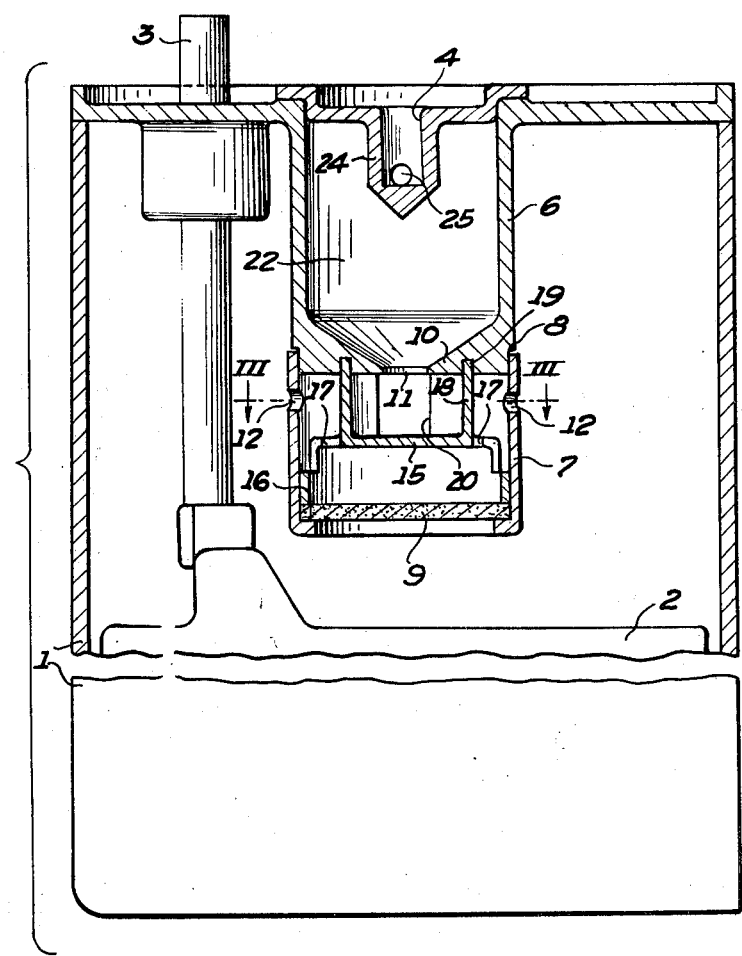
Figure 3:
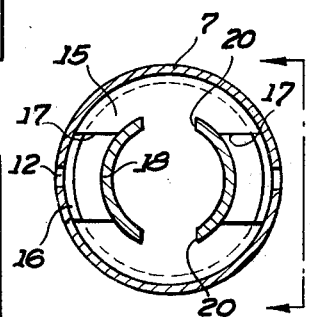
Figure 4:
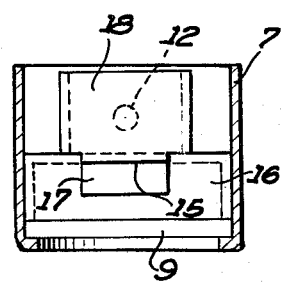

The preferred embodiment of the invention is illustrated in the accompanying drawings, in which
 FIG. 1 is a plan view of the battery;
 FIG. 2 is a fragmentary side view with part shown in vertical section;
 FIG. 3 is a horizontal section taken on the line III—III of FIG. 2; and
 FIG. 4 is a view, partly in vertical section, looking in the direction of the arrows in FIG. 3.

Referring to FIGS. 1 and 2 of the drawings, a wet cell battery case 1 contains battery plates 2 connected to terminal posts 3 mounted in the top of the case. The tops of the plates are spaced some distance from the top of the case. In the center of the top of the case there is a vent 4, around which is the upper end of tubular means extending down into the case but terminating above the plates and the normal electrolyte level. When used as a miner's cap light battery, two of these cells are physically and electrically joined together.

The inside diameter of the tubular means is considerably greater than the diameter of the vent. Preferably, the tubular means consists of a short cylindrical tube 6 integral with the top of the case, and a separate ring 7 secured to the lower end of the tube. For example, the lower end of the tube may be provided with a peripheral recess 8, into which the upper end of the ring fits. This may be a tight frictional fit or the two parts may be secured together in any other suitable manner. The lower end of the ring has an inturned edge, on which a porous disc 9 is seated. The disc may be made of any suitable material that will not be affected by the battery acid. Porous polyvinyl chloride has been found suitable. A disc also could be used that is made porous by providing it with a multiplicity of tiny holes through it, provided the surface tension or wetting property of the electrolyte will permit the liquid to wet the walls of the holes so as to be transferred by capillarity through them.

The lower end of tube 6 is provided with a inwardly projecting annular ledge 10 that forms a relatively small central opening 11 in the lower end of the tube. The side wall of ring 7 is provided near its upper end with one or more lateral ports 12.

Disposed inside the ring 7 there is a baffle that forms tortuous passages leading from the porous disc and side ports 12 to the central opening 11. Preferably, as shown in FIGS. 2, 3 and 4, the baffle includes a horizontal wall 15 fitting in the ring below the side ports and surrounded by an integral side wall 16 extending downwardly and resting on the disc. This horizontal wall is provided with vertical openings 17 close to its edge. For best results, these openings are directly below the side ports. Extending upwardly from the top of the horizontal wall between its openings is a circular upright wall 18 that engages ledge 10 around central opening 11. Most suitably, the upper end of the upright wall is seated in a recess 19 in the bottom of the ledge. The upright wall is provided with at least one notch 20 midway between the side ports, but preferably there are two such notches diametrically opposite each other.

The gases and vapor given off by the cell pass through the porous disc and side ports 12, part way around the upright wall 18 of the baffle and then through its notches 20 and up through central opening 11 to the vent 4. The chamber 22, directly above the central opening is relatively large to form an expansion chamber where the condensed droplets conglomerate and from which they drop through opening 11 onto the baffle. The droplets then fall through the vertical openings 17 in the baffle and pass by gravity and capillary action through the porous disc to the electrolyte below. The expansion chamber also reduces the velocity of the vapor after it enters the chamber so that vapor droplets can conglomerate better.

A very small baffle may also be provided in the expansion chamber in the form of a tiny cup 24 extending downwardly from the top of the case around the vent. The cup is provided with one or more lateral ports 25 for escape of gas.

Side ports 12 allow the gas pressure on the opposite sides of the porous disc to equalize so that pressure in the battery will not prevent passage of liquid down through the disc. The side ports also allow gas to escape from the cell if it is overfilled to a level above the disc. These ports are so small that only an extremely small quantity of electrolyte could be splashed through them, and that will drain back through the porous disc. No matter what the position of the battery, electrolyte will not drain out through ports 12 because the electrolyte level will be below them if the cell has not been overfilled.

According to the provisions of the patent statutes, we have explained the principle of our invention and have illustrated and described what we now consider to represent its best embodiment. However, we desire to have it understood that, within the scope of the appended claims, the invention may be practiced otherwise than as specifically illustrated and described.

We claim:
 1. A wet cell battery comprising a case provided with a top having a vent therein, battery plates in the case spaced from said top, tubular means above said plates extending downwardly from said top around said vent, the lower end of said means having a vertical opening therein, a porous disc closing said opening, said tubular means having an annular ledge therein forming a central opening between said disc and vent, the side of said means between said central opening and disc having a port therein, and a baffle disposed in the tubular means between the ledge and disc and forming a tortuous passage between said port and central opening.
 2. A wet cell battery according to claim 1, in which said tubular means include a tube having said ledge at its lower end, and a separate ring secured to the lower end of the tube and containing said baffle and disc, the bottom of the ring having an inner shoulder supporting the disc, and said baffle resting on the marginal area of the disc and engaging the lower end of the tube to hold the disc against said shoulder.

3. A wet cell battery according to claim 1, in which said baffle includes a horizontal wall extending across said tubular means below said port and provided with a vertical opening close to the edge of the wall, and an upright wall disposed inwardly of said wall opening and extending from said horizontal wall to said ledge around the central opening, the upright wall having an opening through it disposed at least 90° from the opening in the horizontal wall.

4. A wet cell battery according to claim 3, in which there are two of said openings in the horizontal wall disposed about 180° apart, and two of said upright wall openings disposed about 180° apart and 90° from the first two openings.

5. A wet cell battery according to claim 3, in which said horizontal wall is surrounded by a downwardly extending side wall seated on said disc.

References Cited

UNITED STATES PATENTS 2,646,459    7/1953    Gill _____ 136—177

FOREIGN PATENTS

| 319,198 | 9/1929 | Great Britain. |
| 320,903 | 10/1929 | Great Britain. |
| 839,808 | 4/1939 | France. |

WINSTON A. DOUGLAS, Primary Examiner

D. L. WALTON, Assistant Examiner

U.S. Cl. X.R.

220—44